(12) United States Patent
Hershenhorn et al.

(10) Patent No.: US 8,292,163 B2
(45) Date of Patent: Oct. 23, 2012

(54) ANIMAL CREMATION SYSTEM AND PROCESS

(75) Inventors: Robert Hershenhorn, Naples, FL (US); Miro Macho, La Crescenta, CA (US)

(73) Assignee: Robert Hershenhorn, Naples, FL (US)

( * ) Notice: Subject to any disclaimer, the term of this patent is extended or adjusted under 35 U.S.C. 154(b) by 0 days.

(21) Appl. No.: 13/010,399

(22) Filed: Jan. 20, 2011

(65) Prior Publication Data
US 2011/0204135 A1 Aug. 25, 2011

Related U.S. Application Data

(60) Provisional application No. 61/282,514, filed on Feb. 23, 2010.

(51) Int. Cl.
*G06F 17/00* (2006.01)
*A61G 17/00* (2006.01)

(52) U.S. Cl. .............................................. 235/375; 27/1
(58) Field of Classification Search ................... 235/375; 27/1
See application file for complete search history.

(56) References Cited

U.S. PATENT DOCUMENTS

| | | | | |
|---|---|---|---|---|
| 6,970,088 | B2 * | 11/2005 | Kovach | 340/572.1 |
| 7,210,203 | B1 | 5/2007 | Wimprine, Jr. | |
| 2002/0178079 | A1 | 11/2002 | Russell et al. | |
| 2005/0034286 | A1 * | 2/2005 | Landry et al. | 27/11 |
| 2005/0119918 | A1 * | 6/2005 | Berliner | 705/3 |
| 2006/0090676 | A1 * | 5/2006 | Puth | 110/194 |
| 2007/0103313 | A1 * | 5/2007 | Washington | 340/572.8 |
| 2008/0201924 | A2 * | 8/2008 | Sinclair | 27/1 |
| 2009/0007401 | A1 | 1/2009 | Bills | |
| 2009/0248439 | A1 | 10/2009 | Becker et al. | |
| 2010/0005835 | A1 | 1/2010 | Johnson, Sr. et al. | |

OTHER PUBLICATIONS

Ellestad Camacho Funeral Homes & Crematory, "Oakwood Cremation Services," Feb. 18, 2003 [retrieved on Dec. 1, 2011] Retrieved from the Internet: < URL: http://web.archive.org/web/20030218220753/http://www.ellestadfuneralhome.com/oakwood.htm>.*

SecurIDy Cremation Tracking System, "The Future of Crematory Management, All in the Palm of Your Hand," Brochure, 2009, pp. 1-2, Matthews International, Cremation Division, MCD, Apopka, Florida.

International Search Report application No. PCT/US2011/022554 dated Mar. 25, 2011.

* cited by examiner

*Primary Examiner* — Thien M Le
*Assistant Examiner* — Toan Ly
(74) *Attorney, Agent, or Firm* — Squire Sanders (US) LLP (57) ABSTRACT

A system, a method, an apparatus, and a computer program product are provided. The system includes a controller configured to generate an identification tag, in response to a request for an animal cremation service, and a scanner configured to scan the identification tag at a specified time. The system further includes a camera configured to record a viewable area of a cremation machine, when the scanner scans an animal entering the cremation machine or the cremains being removed from the cremation machine. The system ensures that the animal entering the cremation machine matches the cremains being removed from the cremation machine, that the animal has been cremated, and that the cremation was performed at a time defined by the request.

27 Claims, 4 Drawing Sheets

ANIMAL CREMATION SYSTEM AND PROCESS

CROSS REFERENCE TO RELATED APPLICATION

This application claims priority under 35 U.S.C. §119(e) of U.S. Provisional Patent Application Ser. No. 61/282,514, filed on Feb. 23, 2010. The subject matter of the earlier filed application is hereby incorporated by reference.

BACKGROUND

1. Field

Embodiments of the invention relate to an animal cremation system. More specifically, certain embodiments of the invention are directed to a system, a method, an apparatus, and a computer program product for cremating an animal. The animal cremation system provides an animal owner with an assurance that his animal has been properly cremated, that the animal remains, or cremains, that the animal owner receives, are those of his animal, and that the cremation was performed on a timely basis.

2. Description of the Related Art

Presently, each veterinarian ("vet") clinic in the United States employs approximately 2-3 veterinarians ("vets"). Each vet maintains a client population of approximately 1,500-1,800 animals or pets, for example, dogs and cats. Ninety-five percent of all pets that are patients of a vet practice die at the vet's office (i.e., approximately 143-171 dogs and cats per vet die each year or approximately 11-13 dogs and cats per vet die each month). The vet is the primary referral source of deceased animals for cremation. For example, ninety percent of animal deaths in vets' offices are handled by cremation.

Traditionally, animal cremations are performed by private cremators who provide private (or individualized) and bulk cremation services. Upon completion of the cremation process, animal cremains are generally returned to the vet's office for the bereaved owner to pick up.

Current cremation services, however, fail to provide an animal owner with a third party independent assurance that his animal was cremated in the process selected by the animal owner (i.e. private versus bulk cremation), and that the cremains returned to the animal owner are those of his animal.

SUMMARY

In accordance with an embodiment of the invention, there is provided animal cremation system, which includes a controller configured to generate an identification tag, in response to a request for an animal cremation service, and a scanner configured to scan the identification tag at a specified time. The system further includes a camera configured to record a viewable area of a cremation machine, when the scanner scans an animal entering the cremation machine or the cremains being removed from the cremation machine. The system ensures that the animal entering the cremation machine matches the cremains being removed from the cremation machine, that the animal has been cremated, and that the cremation was performed at a time defined by the request.

In accordance with another embodiment of the invention, there is provided a method for cremating an animal, which includes generating an identification tag, in response to a request for an animal cremation service, and scanning the identification tag at a specified time. The method further includes recording a viewable area of a cremation machine, when the scanner scans an animal entering the cremation machine or the cremains being removed from the cremation machine. The method ensures that the animal entering the cremation machine matches the cremains being removed from the cremation machine, that the animal has been cremated, and that the cremation was performed at a time defined by the request.

In accordance with another embodiment of the invention, there is provided an apparatus, which includes at least one memory including computer program code, and at least one processor. The at least one memory and the computer program code are configured to, with the at least one processor, cause the apparatus at least to generate an identification tag, in response to a request for an animal cremation service, and scan the identification tag at a specified time. The at least one memory and the computer program code are also configured to, with the at least one processor, cause the apparatus at least to record a viewable area of a cremation machine, when the scanner scans an animal entering the cremation machine or the cremains being removed from the cremation machine. The apparatus ensures that the animal entering the cremation machine matches the cremains being removed from the cremation machine, that the animal has been cremated, and that the cremation was performed at a time defined by the request.

In accordance with another embodiment of the invention, there is provided a computer program product embodied on a non-transitory computer readable medium. The computer program product is encoded with instructions to control a processor to perform a process, which includes generating an identification tag, in response to a request for an animal cremation service, and scanning the identification tag at a specified time. The process further includes recording a viewable area of a cremation machine, when the scanner scans an animal entering the cremation machine or the cremains being removed from the cremation machine. The process ensures that the animal entering the cremation machine matches the cremains being removed from the cremation machine, that the animal has been cremated, and that the cremation was performed at a time defined by the request.

BRIEF DESCRIPTION OF THE DRAWINGS

Further aspects, details, advantages and modifications of the invention will become apparent from the following detailed description of the embodiments, which is to be taken in conjunction with the accompanying drawings, in which.

DETAILED DESCRIPTION OF THE PREFERRED EMBODIMENT(S)

It will be readily understood that the components of the invention, as generally described and illustrated in the figures herein, may be arranged and designed in a wide variety of different configurations. Thus, the following detailed description of the embodiments of a system, a method, an apparatus, and a computer program product, as represented in the attached figures, is not intended to limit the scope of the invention as claimed, but is merely representative of selected embodiments of the invention.

If desired, the different functions discussed below may be performed in a different order and/or concurrently with each other. Furthermore, if desired, one or more of the above-described functions may be optional or may be combined. As such, the foregoing description should be considered as merely illustrative of the principles, teachings and embodiments of this invention, and not in limitation thereof.

Certain embodiments of the invention combine hardware and software components to create a system, a method, an apparatus, and a computer program product for cremating an animal, for example, a pet. In particular, certain embodiments of the invention provide a system, a method, an apparatus, and a computer program product for assuring an animal owner that his animal has been properly cremated by the selected process within a timely manner, and that the cremains that the animal owner receives are those of his animal.

Figure 1:
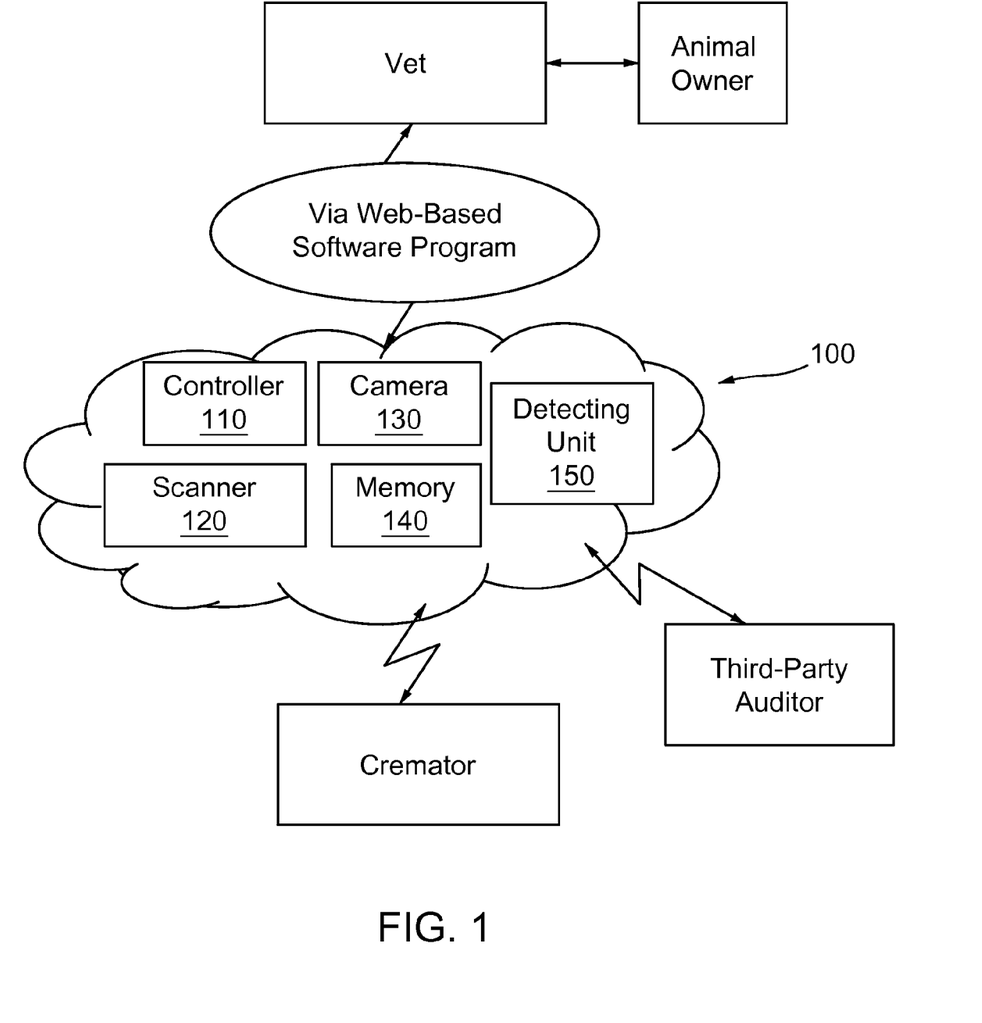
FIG. 1 shows a schematic block diagram of an animal cremation system, in accordance with an embodiment of the invention.

FIG. 1 shows a schematic block diagram of an animal cremation system, in accordance with an embodiment of the invention. The system 100 can include a controller 110, a scanner or a plurality of scanners 120, a camera or a plurality of cameras 130, memory 140, and a detecting unit 150. The controller 110 may be configured to generate a transportation identification (ID) tag in response to a request for an animal cremation. In accordance with an embodiment of the invention, the controller 110 may include, for example, a programmable logic controller. The cremation request may be received by a cremator from the vet's office when a vet places a cremation order request using a web-based, pet cremation software program that may be stored within a database of the controller 110. The controller 110 may be further configured to, using a point-of-sale architecture, provide animal owners with the ability to purchase upgraded cremation services, memorial urns, and pet memorabilia through the web-based, pet cremation software program. Further, the controller 110 may be configured to electronically manage all billing of fees associated with the cremation services so that the cremator and vet are not burdened by paper invoicing or collections of payment from the animal owner. Payment received from the animal owner by the vet may be automatically and immediately distributed to the vet, the cremator, and a third party operating the web-based, pet cremation software program to assure that all participants or individuals involved in the process may be properly compensated. This feature also accelerates the collection of receivables for the cremator and eliminates the need for reconciliation between the cremator and the vet with respect to what is payable and what was ordered by the animal owner. Payments may be made by the animal owner using a credit card facilitator, such as PayPal, and the pet cremation software program. Funds may be automatically deposited into the payee's (the cremator, the vet, or the third party operating the web-based, pet cremation software program) bank account with reconciliation statements provided to each party.

The transportation ID tag can include, for example, a scannable ID, such as a bar code or a radio frequency ID (RFID) component, encoded with the following information: (1) the animal owner's contact information, including, for example, name, address, phone number, and email address, (2) the animal's ID, including, for example, name, breed, color, and any physical identifying marks, (3) the selected cremation process, including, for example, private or bulk cremation, (4) a destination address for the cremains, for example, the vet's office or the animal owner's residence, and (5) additional goods or services selected by the animal owner, including, for example, upgraded cremation services, such as paw prints and hair clippings, memorial urns, and pet memorabilia. The transportation ID tag may be made of any perishable material, including, but not limited to, paper, plastic, or material alike.

The controller 110 can further be configured to operate the scanner 120 or one of the plurality of scanners 120, for example, a handheld or fixed scanner, to scan the transportation ID tag that has been attached to the animal prior to transporting the animal from the vet's office.

The controller 110 can further be configured to manually or automatically generate or transmit a notification, for example, by e-mail or telephone, to notify the animal owner that his deceased animal is prepared for transportation to the cremator. The notification can assure the animal owner that his animal has not been sitting for an extended period of time at the crematory or vet's office. The animal owner and the vet can elect whether or not they each wish to receive notifications throughout the cremation process. Using a link in the received notification, the animal owner can select whether to proceed with the cremation, change the type of cremation, or cancel the cremation request within a set period of time, for example, 48 hours. For telephone notifications, the animal owner can make his selections using the keypad on his telephone. If the animal owner chooses to proceed, the animal may be transported to the cremator. The notification for the vet can inform the vet of any changes made by the animal owner.

Upon receiving the animal at the cremator, the controller 110 may be configured to operate another one of the plurality of scanners to scan the scannable ID of the transportation ID tag to verify that the animal transported from the vet office is the same animal received at the cremator, and further to ensure that the animal is expeditiously processed by the cremator and returned expeditiously to the vet's office. As previously discussed, if elected, the animal owner and/or the vet can receive a notification from the controller 110 indicating that the animal has arrived at the cremator. This notification allows the animal owner to make any changes to the cremation process and informs the vet of any changes made by the animal owner.

Prior to placing the animal in a cremation machine, the controller 110 controls the scanner 120 or another one of the plurality of scanners 120 to scan the transportation ID tag. If the transportation ID tag is made of a perishable material, the operator can replace the transportation ID tag with a cremation ID tag. The cremation ID tag may be made of any non-perishable material, including, but not limited to, metal. The cremation ID tag may be linked to the transportation ID tag to assure that the proper cremains are identified when the animal is removed from the cremation machine.

In another embodiment of the invention, the transportation ID tag may be made of any non-perishable, printable material, and therefore the transportation ID tag can also function as the cremation ID tag. Hence, a single ID tag can function as both the transportation ID tag and the cremation ID tag.

The controller 110 can further be configured to link the information encoded on the transportation ID tag with the ID number imprinted on the cremation ID tag. The controller 110 can further be configured to operate the camera or the plurality of cameras 130 to start a recording of a viewable area of the cremation machine to ensure that the animal placed into the cremation machine is the cremains of that animal that are removed from the cremation machine. Scanning the transportation ID tag and linking the information encoded on the transportation ID tag with an ID number imprinted on the cremation ID tag verifies that the type of cremation selected by the animal owner is carried out by the cremator before the cremation begins, i.e., private versus bulk cremation. As previously discussed, if elected, the animal owner and/or the vet can receive a notification from the controller 110 indicating that the animal has been cremated.

In another embodiment of the invention, the controller 110 can further be configured to control the scanner 120 or another one of the plurality of scanners 120 to scan the transportation ID tag and a label on the cremation machine prior to placing the animal in the cremation machine. The label on the cremation machine identifies the type of the cremation machine (i.e., a private or a communal cremation machine). The controller 110 can further be configured to secure a door of the cremation machine in a locked position until it verifies a match between the type of cremation for the animal designated by the animal owner and the type of cremation machine being used. This is to ensure that the type of cremation (i.e., private versus bulk cremation) selected by the animal owner is carried out by the cremator.

Upon removal of the cremains from the cremation machine, the controller 110 may be configured to link the imprinted ID number on the cremation ID tag to the scannable ID of the transportation ID tag, that was attached to the animal when it arrived from the vet, by operating another one of the plurality of scanners to ensure that the animal placed into the cremation machine is the cremains that are removed from the cremation machine. The scanning of the transportation ID tag, upon removal of the cremains from the cremation machine, verifies that the selected cremation process was performed (e.g., a private cremation versus a bulk cremation), within a timely manner. When the transportation ID tag is scanned, the controller 110 may be configured to operate the camera or the plurality of cameras 130 to stop the recording of the viewable area of the cremation machine. In one embodiment, if elected, the animal owner and/or the vet can receive a notification from the controller 110 indicating that the animal has been cremated and ready for transportation. The email or telephone notification provides the animal owner and the vet with confirmation of cremation and an estimated time of shipment so that both can plan accordingly for the transportation of the cremains. The email or telephone notification eliminates the need for the animal owner to contact the vet to determine when the cremation will be completed and the cremains returned to the vet or the animal owner.

The cremains can now be transported from the cremator back to the vet's office or directly to a location specified by the animal owner in the urn, as selected by the animal owner at the time of the cremation request. This information may be stored on the transportation ID tag.

The memory 140 may be configured to archive and store the recording described above. The memory 140 may be for example, a hard drive or a removable drive of a digital video recorder, for use by a third-party auditor or the animal owner. The archiving of the recording may be backed up, for example, hourly or daily and transmitted to the third-party auditor for random audits. The third-party auditor can audit the recording by comparing the cremation services selected by the animal owner, as described on the order form, with the actual cremation services rendered to determine if the animal owner received the services that were selected and that the services were performed in a timely manner.

The animal owner can also request to view the recording to verify that he received the services that he selected and that the services were performed in a timely manner.

The detecting unit 150 can include, for example, a laser or a motion detection unit within another device, such as the camera 130 itself. The detecting unit 150 may be positioned at the entrance of the cremation machine and be configured to start the recording of the animal cremation process. In accordance with another embodiment of the invention, the detecting unit 150 can be part of another device, such as the camera 130, which detects motion when its sensors are positioned at the entrance of the cremation machine. The positioning of the detecting unit 150 serves to trigger the camera or the plurality of cameras 130 and to prevent the animal from entering the cremation machine without the camera capturing the cremation of the identified animal. In one embodiment, the transportation ID tag may be scanned and may be replaced with the cremation ID tag prior to placing the animal in the cremation machine, and vice versa when removing the cremains from the cremation machine. This process serves to help confirm that the animal is being cremated by the service selected by the animal owner. The detecting unit 150 is further configured to notify the controller 110, so that the controller 110 can operate the camera or the plurality of cameras 130 to start the recording for documenting any deviation from the standard cremation process for auditing purposes.

In one embodiment, the scanning device 120 can scan the transportation ID tag, whereby the transportation ID tag may be replaced with the cremation ID tag prior to placing the animal in the cremation machine, and vice versa when removing the cremains from the cremation machine. This process helps confirm that the correct animal is being cremated by the service selected by the animal owner. The scanner 120 can further be configured to notify the controller 110, so that the controller 110 can operate the camera or the plurality of cameras 130 to start the recording for documenting any deviation from the standard cremation process for auditing purposes.

Figure 2:
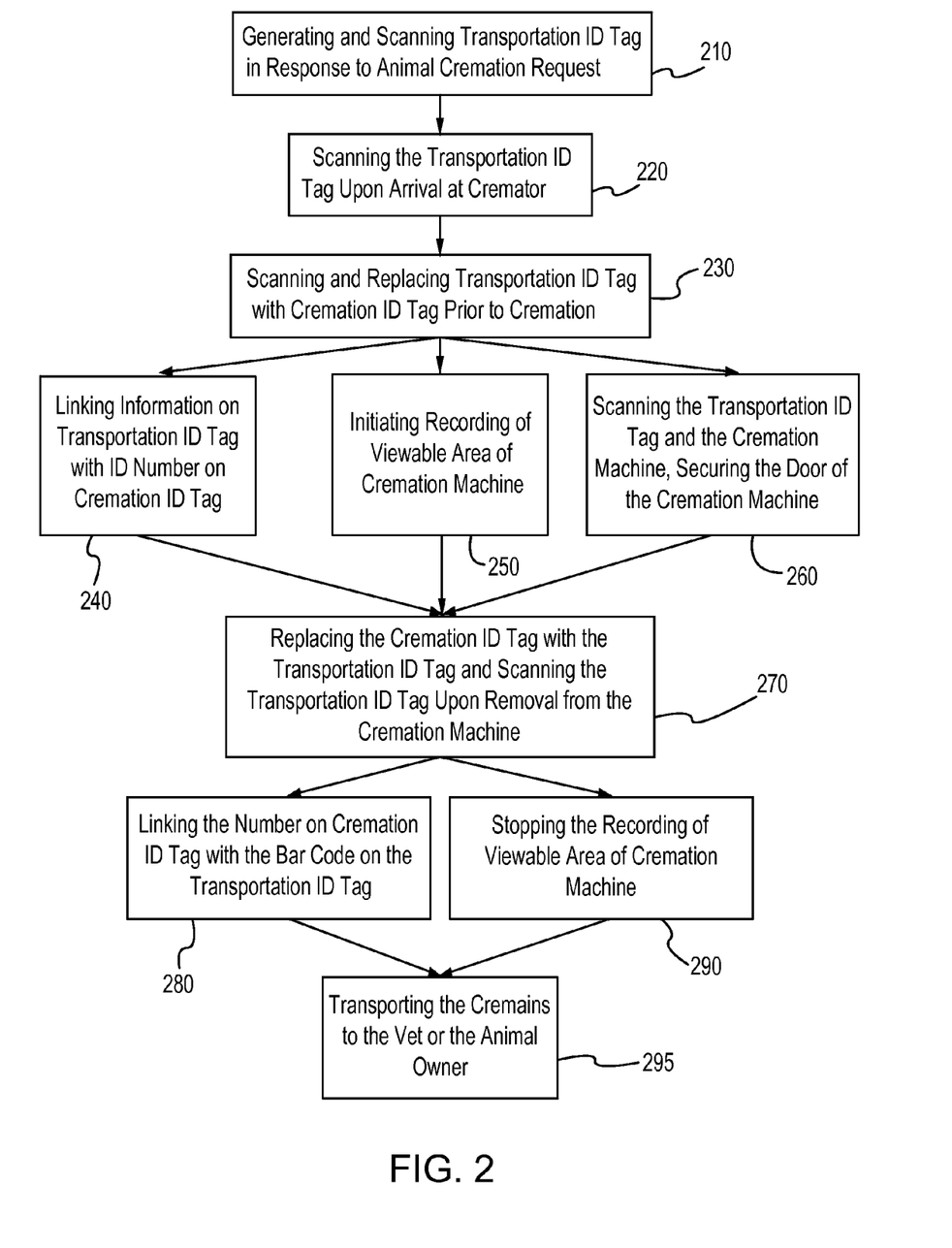
FIG. 2 shows a flow diagram of a method for cremating an animal, in accordance with an embodiment of the invention.

FIG. 2 shows a flow diagram of a method for cremating an animal, in accordance with an embodiment of the invention. The method, as illustrated in FIG. 2, can include generating a transportation ID tag in response to a request for an animal cremation (step 210). The cremation request may be received from the vet's office when a vet accesses a processor and places the cremation order request using a web-based, pet cremation software program. The processor can include a point-of-sale architecture to provide animal owners with the ability to purchase upgraded cremation services, memorial urns, and pet memorabilia. The processor can also electronically manage all billing of fees associated with the cremation services so that the cremator and vet are not burdened by paper invoicing or collections of payment from the animal owner.

The method of generating the transportation ID tag can include attaching the transportation ID tag to the animal prior to transporting the animal to a cremator. The method of generating the transportation ID tag may be accomplished utilizing any common laser printer. Once printed, the transportation ID tag can further include scanning the transportation ID tag, using a scanner, for example, a handheld or fixed scanner, to record that the animal has been picked up prior to transporting the animal from the vet's office.

Scanning the transportation ID tag can include manually or automatically generating or transmitting a notification, for example, by e-mail or telephone, to notify the animal owner that his deceased animal is prepared for transportation to the cremator. The notification can assure the animal owner that his animal has not been sitting for an extended period of time at the vet's office. The animal owner and the vet can elect whether or not they each wish to receive notifications throughout the cremation process. Using a link in the received notification, the animal owner can select whether to proceed with the cremation, change the type of cremation, or cancel the cremation request within a set period of time, for example, 48 hours. For telephone notifications, the animal owner can make his selections using the keypad on his telephone. If the animal owner chooses to proceed, the animal may be transported to the cremator. The notification for the vet can inform the vet of any changes made by the animal owner.

As further illustrated in FIG. 2, the method can further include, upon receiving the animal at the cremator, scanning the scannable ID of the transportation ID tag to verify that the animal transported from the vet office is the same animal received at the cremator, and further to ensure that the animal is expeditiously transported to the cremator from the vet's office (step 220). As previously discussed, if elected, the animal owner and/or the vet can receive a notification that the animal has arrived at the cremator. This notification allows the animal owner to make any changes to the cremation process and informs the vet of any changes made by the animal owner.

Prior to placing the animal in a cremation machine, the transportation ID tag is scanned, using the scanner, and may be replaced with a cremation ID tag (step 230). The cremation ID tag can include a metal, heat-resistant tag. The step of scanning the transportation ID tag can include linking the information encoded on the transportation ID tag with an ID number imprinted on the cremation ID tag (step 240). The step of scanning the transportation ID tag also can include initiating a recording of a viewable area of the cremation machine to ensure that the animal placed into the cremation machine is the cremains that are removed from the cremation machine (step 250). Scanning the transportation ID tag and linking the information encoded on the transportation ID tag with an ID number imprinted on the cremation ID tag verifies that the type of cremation selected by the animal owner is carried out by the cremator before the cremation begins, i.e., private versus bulk cremation.

Further, the method, as illustrated in FIG. 2, can include (step 260) scanning, using the scanner 120 or another one of the plurality of scanners 120, the transportation ID tag and a label on the cremation machine prior to placing the animal in the cremation machine. The label on the cremation machine identifies the type of the cremation machine (i.e., a private or a communal cremation machine). The method can further include securing a door of the cremation machine in a locked position until it verifies a match between the type of cremation for the animal designated by the animal owner and the type of cremation machine being used, using a detecting unit which may include, for example, a laser or a camera. This is to ensure that the type of cremation (i.e., private versus bulk cremation) selected by the animal owner is carried out by the cremator.

Further, the method, as illustrated in FIG. 2, can include (step 270) replacing the cremation ID tag with the transportation ID tag, upon removal of the cremains from the cremation machine, to further ensure that the animal placed into the cremation machine is the cremains that are removed from the cremation machine. The step of replacing the cremation ID tag with the transportation ID tag can include linking the imprinted ID number on the cremation ID tag to the scannable ID of the transportation ID tag that was attached to the animal when it arrived from the vet by scanning, using the scanner, the transportation ID tag (step 280). The scanning of the transportation ID tag, upon removal of the cremains from the cremation machine, verifies that the selected cremation process was performed (e.g., a private cremation versus a bulk cremation), within a timely manner. The recording of the viewable area of the cremation machine is stopped when the transportation ID tag is scanned (step 290). As previously discussed, if elected, the animal owner and/or the vet can receive a notification that the animal has been cremated and ready for transportation. The email or telephone notification provides the animal owner and the vet with confirmation of cremation and an estimated time of shipment so that both can plan accordingly for the transportation of the cremains. The email or telephone notification eliminates the need for the animal owner to contact the vet to determine when the cremation will be completed and the cremains returned to the vet or the animal owner.

The method further can include transporting the cremains from the cremator back to the vet's office or directly to a location specified by the animal owner in the urn selected by the animal owner at the time of the cremation request (step 295). This information may be stored on the transportation ID tag.

The recording described above may be archived in a memory, for example, a hard drive or a removable drive of a digital video recorder, for audit purposes by a third-party auditor. The archiving of the recording may be backed up, for example, hourly or daily and transmitted to the third-party auditor for random audits. The third-party auditor can audit the recording by comparing the cremation services selected by the animal owner, as described on the order form, with the actual cremation services rendered to determine if the animal owner received the services that were selected and that the services were performed in a timely manner.

The animal owner can also request to view the recording to verify that he received the services that he selected and that the services were performed in a timely manner.

The steps of scanning described above may be performed using a single scanner or a plurality of scanners.

Figure 3:
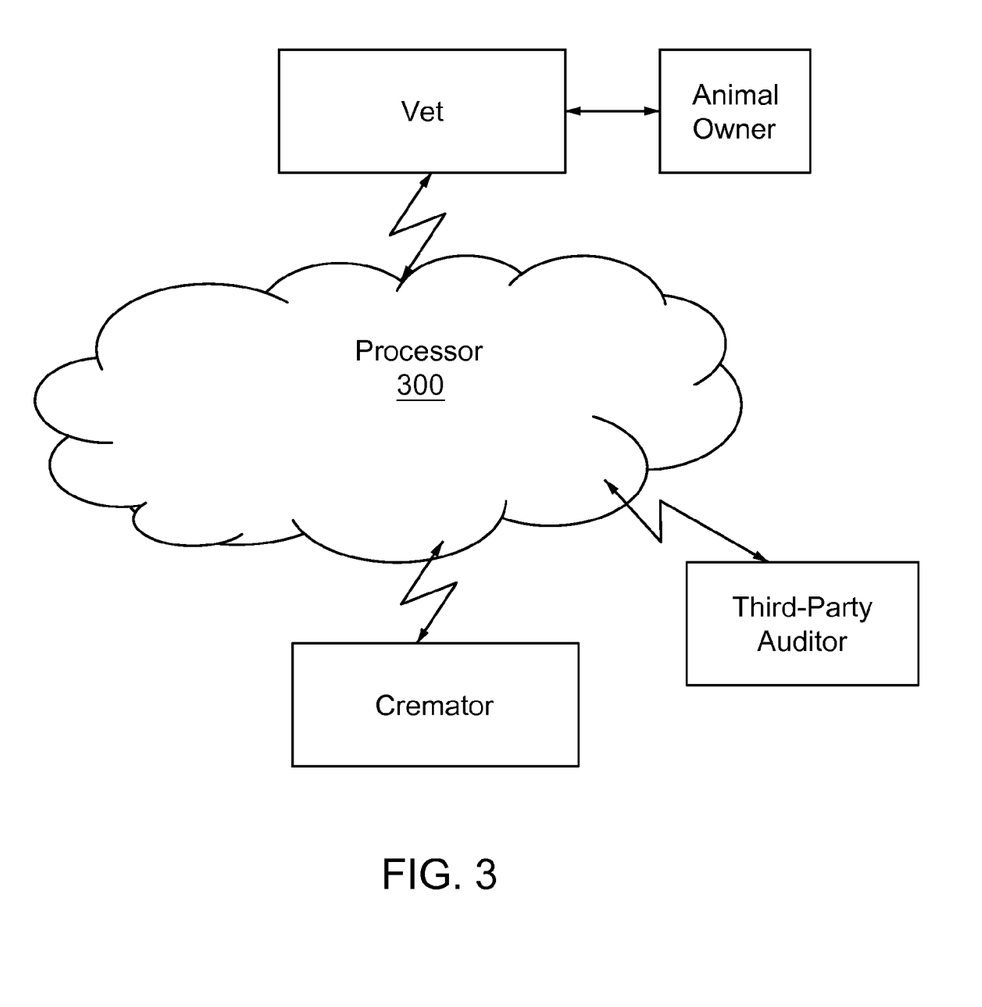
FIG. 3. shows a schematic block diagram of an apparatus of an animal cremation system, in accordance with an embodiment of the invention.

FIG. 3 shows a schematic diagram of an apparatus of an animal cremation system, in accordance with one embodiment of the invention. The apparatus, for example a processor 300, may be configured to perform the functionality of all the structural elements, the controller 110, the scanner 120 or the plurality of scanners 120, the camera 130, the memory 140, and the detecting unit 150, as discussed above for the system 100.

Figure 4:
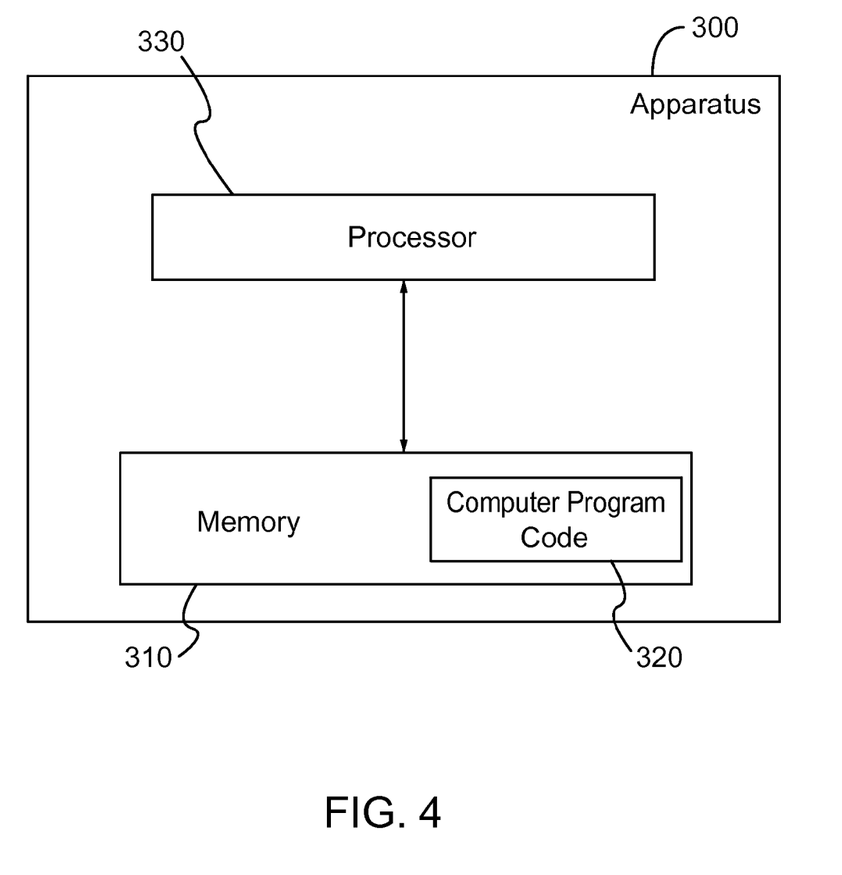
FIG. 4 shows a detailed schematic diagram of the apparatus, as illustrated in FIG. 3, in accordance with an embodiment of the invention.

FIG. 4 shows a detailed schematic diagram of the apparatus, as illustrated in FIG. 3, in accordance with an embodiment of the invention. In accordance with an embodiment of the invention, the apparatus 300 includes a memory 310 including computer program code 320. The computer program code 320 is embodied on a computer readable non-transitory medium. The apparatus 300 includes a processor 330 for processing information and executing instructions or operations. The memory 310 is coupled to the processor 330 for storing information and instructions to be executed by the processor 330. The computer program code 320 is encoded with instructions to control the processor 330 to perform the method discussed above and illustrated in FIG. 2.

While a single memory 310 and a single processor 330 are illustrated in FIG. 4, multiple memory and multiple processors may be utilized according to other embodiments.

In accordance with one embodiment of the invention, the processor 330 may be configured to perform the functionality of all the structural elements, the controller 110, the scanner 120 or the plurality of scanners 120, the camera 130, the memory 140, and the detecting unit 150, as discussed above for the system 100.

Some of the many advantages of embodiments of the invention include assuring the animal owner that his animal was cremated using the cremation service selected at the vet office, and that the cremation was performed in a timely manner. Further, embodiments of the invention provide a web-based, pet cremation software program for handling cremation service orders that reduces processing errors and fraudulent practices by the cremator, a point-of-sale architecture for encouraging animal owners to purchase upgraded cremations, memorial urns and pet memorabilia. The software program may utilize custom application software programs, for example, orca2000+PCS. Embodiments of the invention also provide a tracking system utilizing a scannable ID, such as a bar-coded instruction label or a RFID tag, bar-code or RFID readers, such as a fixed mount or handheld scanner, and auditing system, to prevent processing errors and fraudulent practices by the cremator. Further embodiments of the invention provide for random auditing to provide additional assurances by an independent third party to the animal owner that the animal has been cremated, that the cremains that the animal owner receives are those of this animal, and that the cremation was performed at a time defined by the request.

Further to the discussion above, it is to be understood that in an embodiment of the invention, the steps and the like may be changed without departing from the spirit and scope of the present invention. In addition, the method described in FIG. 2 may be repeated numerous times.

A computer program code 320 according to certain embodiments of the invention, may be composed of modules that are in operative communication with one another, and which are designed to pass information or instructions to an electronic device, such as a personal computer, a handheld device, such as a mobile, a cellular telephone, or a personal digital assistant (PDA) having wireless communication capabilities, a portable computer having wireless communication capabilities and a portable unit or a terminal that incorporates combinations of such functions, as non-limiting examples.

The computer program code 320 may be configured to operate on a general purpose computer or an application specific integrated circuit (ASIC).

The computer readable (i.e., non-transitory) storage medium may include any media or means that may contain, store, communicate, propagate or transport the instructions for use by or in connection with an instruction execution system, apparatus, or device, for example, a disk media, computer memory, or other storage device. Non-transitory storage medium does not include a transitory signal. Examples of non-transitory storage medium may include, for example, a computer-readable medium, a computer distribution medium, a computer-readable storage medium, and a computer program.

The embodiments of the invention discussed above may be implemented by hardware, computer software executable by one or more of the controller 110, the processor 330, or by a combination of hardware and software.

The software and/or hardware may reside on the controller 110, the processor 330, or other electronic devices. If desired, part of the software and/or hardware may reside on the controller 110 or the processor 330, and part of the software and/or hardware on other electronic devices. In an embodiment of the invention, software, or an instruction set may be maintained on any one of various conventional computer-readable media.

The steps of the method, as illustrated for example in FIG. 2, described in connection with the embodiments disclosed herein may be embodied directly in hardware, in a computer program executed by a processor, or in a combination of the two. A computer program may be embodied on a computer readable medium, such as a storage medium. For example, a computer program can reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art. The storage medium may be coupled to the processor such that the processor can read information from, and write information to, the storage medium. In the alternative, the storage medium may be integral to the processor. The processor and the storage medium can reside in an application specific integrated circuit (ASIC). In the alternative, the processor and the storage medium can reside as discrete components.

In accordance with an embodiment of the invention, there is provided a computer program product embodied on a non-transitory computer readable storage medium. The computer program product is encoded with instructions to control a processor to perform a process, which includes generating an identification tag, in response to a request for an animal cremation service, and scanning the identification tag at a specified time. The process further includes recording a viewable area of a cremation machine, when the scanner scans an animal entering the cremation machine or the cremains being removed from the cremation machine. The process ensures that the animal entering the cremation machine matches the cremains being removed from the cremation machine, that the animal has been cremated, and that the cremation was performed at a time defined by the request.

One having ordinary skill in the art will readily understand that the invention as discussed above may be practiced with steps in a different order, and/or with hardware elements in configurations which are different than those which are disclosed. Therefore, although the invention has been described based upon these preferred and non-limiting embodiments, it would be apparent to those of skill in the art that certain modifications, variations, and alternative constructions would be apparent, while remaining in the spirit and scope of the invention. Thus, the example embodiments do not limit the invention to the particular listed devices and technologies. In order to determine the metes and bounds of the invention, therefore, reference should be made to the appended claims.

We claim:
1. An animal cremation system, comprising:
    a controller configured to generate an identification tag, in response to a request for an animal cremation service;
    a scanner configured to scan the identification tag at a specified time; and
    a camera configured to record a viewable area of a cremation machine, wherein the controller is configured to operate the camera to record the viewable area of the cremation machine when the scanner scans an animal entering the cremation machine or when the cremains are being removed from the cremation machine, to ensure that the animal entering the cremation machine matches the cremains being removed from the cremation machine, that the animal has been cremated, and that the cremation was performed at a time defined by the request,
    wherein the controller is further configured to operate the camera to document any deviation from a type of cremation designated by an owner of the animal in the request.
2. The animal cremation system of claim 1, wherein the controller is configured to operate the scanner and the camera.
3. The animal cremation system of claim 1, wherein the scanner is configured to scan the identification tag at the specified time comprising one of upon arrival at a cremator, prior to placing the animal into the cremation machine, upon removal of the cremains from the cremation machine, and prior to transporting the cremains to one of a vet or an animal owner.

4. The animal cremation system of claim 1, wherein the controller comprises a point-of-sale architecture configured to provide an animal owner with the ability to purchase one of an upgraded cremation service, a memorial urn and pet memorabilia.

5. The animal cremation system of claim 1, wherein the controller is configured to electronically manage a billing of fees associated with the animal cremation service.

6. The animal cremation system of claim 5, wherein the controller is configured to distribute an appropriate share of the fees received to differing entities associated with the animal cremation service.

7. The animal cremation system of claim 6, wherein the differing entities include at least one of a veterinarian, a cremator, and a third-party auditor.

8. The animal cremation system of claim 1, wherein the controller is configured to generate the identification tag comprising a scannable ID encoded with one of an animal owner's contact information, an animal's identification, a selected cremation process, a destination address for the cremains, and additional goods or services selected by an animal owner.

9. The animal cremation system of claim 1, wherein the scanner comprises one of a handheld and a fixed scanner.

10. The animal cremation system of claim 1, wherein the controller is configured to transmit a notification to an animal owner that the animal is prepared for transportation to the cremator, that the animal has arrived at the cremator, that the animal has been cremated, and that the animal is ready for transport, and wherein the notification comprises one of an e-mail message, a text message and a telephone call.

11. The animal cremation system of claim 1, wherein the controller is configured to link information encoded on the identification tag with a cremation tag attached to the animal entering the cremation machine and the cremains being removed from the cremation machine.

12. The animal cremation system of claim 11, wherein the cremation tag comprises a non-perishable material.

13. The animal cremation system of claim 1, further comprising:
a memory configured to store a recording of the viewable area of the cremation machine,
wherein the controller is configured to retrieve the recording from the memory and transmit the recording to a third-party auditor.

14. The animal cremation system of claim 1, further comprising:
a detecting unit positioned at an entrance of the cremation machine or configured to detect motion at the entrance of the cremation machine, and configured to start a recording of the viewable area of the cremation machine, when the animal enters the cremation machine.

15. The animal cremation system of claim 1, wherein the controller is further configured to control the scanner to scan the identification tag and a label on the cremation machine prior to placing the animal in the cremation machine.

16. The animal cremation system of claim 15, wherein the controller is further configured to secure a door of the cremation machine in a locked position until it verifies a match between the type of cremation for the animal designated by the animal owner and a type of cremation method being used.

17. The animal cremation system of claim 16, wherein the type of cremation method comprises one of a bulk cremation, private cremation, semi-private cremation, or partitioned cremation.

18. A method for cremating an animal, comprising:
generating, by a controller, an identification tag, in response to a request for an animal cremation service;
scanning the identification tag at a specified time; and
operating, by the controller, a camera to record a viewable area of a cremation machine when the scanner scans an animal entering the cremation machine or when the cremains are being removed from the cremation machine, to ensure that the animal entering the cremation machine matches the cremains being removed from the cremation machine, that the animal has been cremated, and that the cremation was performed at a time defined by the request,
wherein the operating comprises operating the camera to document any deviation from a type of cremation designated by an owner of the animal in the request.

19. The method of claim 18, wherein the scanning comprises scanning the identification tag at the specified time comprising one of upon arrival at a cremator, prior to placing the animal into the cremation machine, upon removal of the cremains from the cremation machine, and prior to transporting the cremains to one of a vet or an animal owner.

20. The method of claim 18, further comprising:
transmitting a notification to an animal owner that the animal is prepared for transportation to the cremator, that the animal has arrived at the cremator, that the animal has been cremated, and that the animal is ready for transport, and wherein the notification comprises one of an e-mail message, a text message and a telephone call.

21. The method of claim 18, further comprising:
linking information encoded on the identification tag with a cremation tag attached to the animal entering the cremation machine and the cremains being removed from the cremation machine.

22. The method of claim 18, further comprising:
transmitting a recording of the viewable area of the cremation machine to a third-party auditor.

23. The method of claim 18, further comprising:
starting, using a detecting unit, a recording of the viewable area of the cremation machine, when the animal enters the cremation machine.

24. The method of claim 18, further comprising:
scanning the identification tag and a label on the cremation machine prior to placing the animal in the cremation machine.

25. The method of claim 24, further comprising:
securing a door of the cremation machine in a locked position until it verifies a match between the type of cremation for the animal designated by the animal owner and a type of cremation machine being used.

26. An apparatus, comprising:
at least one memory including computer program code; and
at least one processor,
wherein the at least one memory and the computer program code are configured to, with the at least one processor, cause the apparatus at least to:
generate an identification tag, in response to a request for an animal cremation service;
scan the identification tag at a specified time;
control a camera to record a viewable area of a cremation machine when the scanner scans an animal entering the cremation machine or when the cremains are being removed from the cremation machine, to ensure that the animal entering the cremation machine matches the cremains being removed from the cremation machine, that the animal has been cremated, and that the cremation was performed at a time defined by the request; and operate the camera to document any deviation from a type of cremation designated by an owner of the animal in the request.

27. A computer program product embodied on a non-transitory computer readable storage medium, the computer program product being encoded with instructions to control a processor to perform a process, the process comprising:

generating an identification tag, in response to a request for an animal cremation service, scanning the identification tag at a specified time, recording a viewable area of a cremation machine when the scanner scans an animal entering the cremation machine or when the cremains are being removed from the cremation machine, to ensure that the animal entering the cremation machine matches the cremains being removed from the cremation machine, that the animal has been cremated, and that the cremation was performed at a time defined by the request, and operating the camera to document any deviation from a type of cremation designated by an owner of the animal in the request.

* * * * *